Oct. 22, 1929. J. H. CRAWFORD Re. 17,467

MINING APPARATUS

3 Sheets-Sheet 1

Original Filed Jan. 10, 1925

Witness:
R. Burkhardt.

Inventor:
John H. Crawford,
By Wilkinson Huxley Byron & Knight
Attys.

Oct. 22, 1929. J. H. CRAWFORD Re. 17,467
MINING APPARATUS
3 Sheets-Sheet 2
Original Filed Jan. 10, 1925
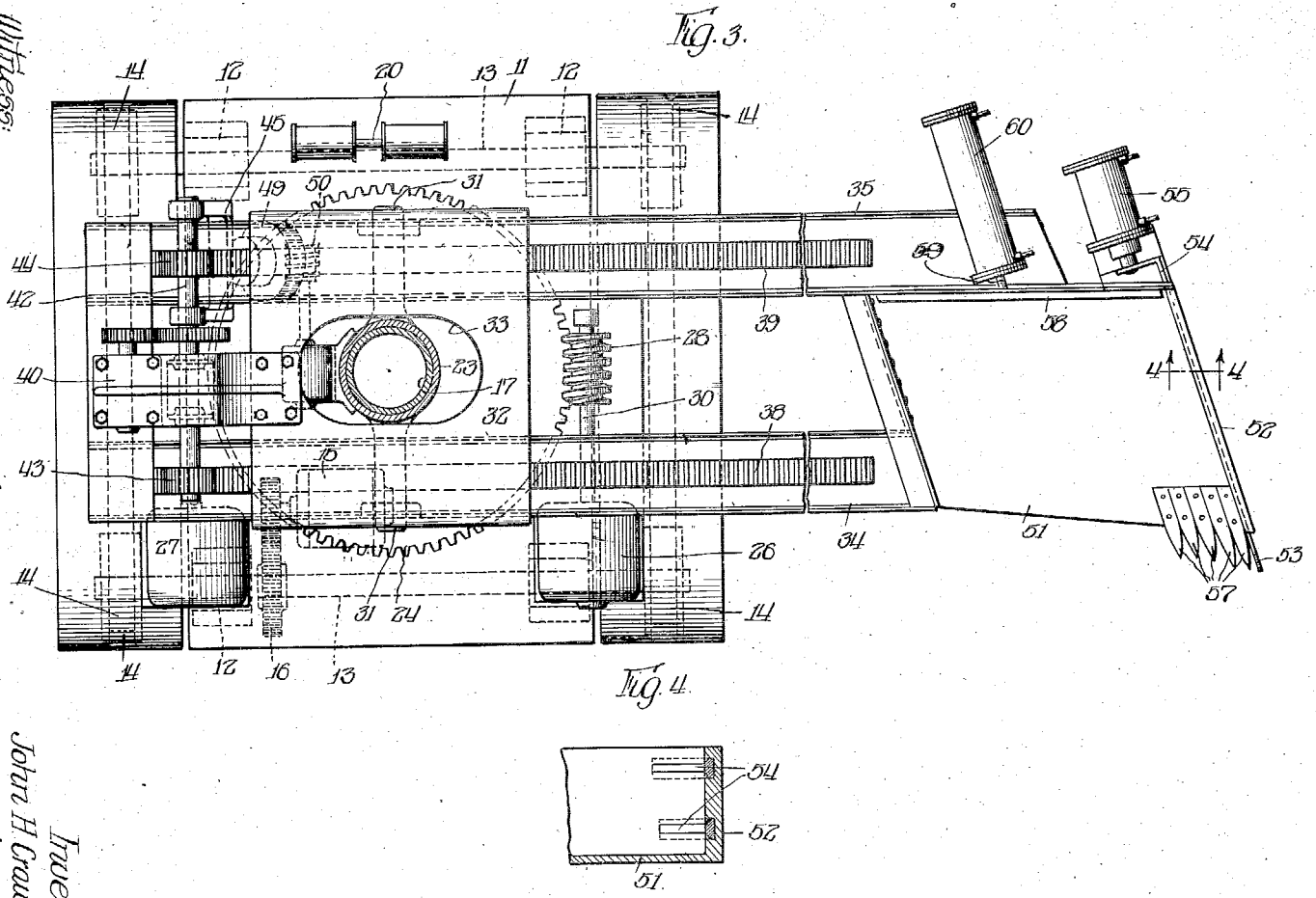
Witness:
R. Burkhardt.
Inventor:
John H. Crawford,
By Wilkinson Huxley Byron & Knight
Attys.

Oct. 22, 1929.
J. H. CRAWFORD
MINING APPARATUS
Re. 17,467
3 Sheets-Sheet 3
Original Filed Jan. 10, 1925
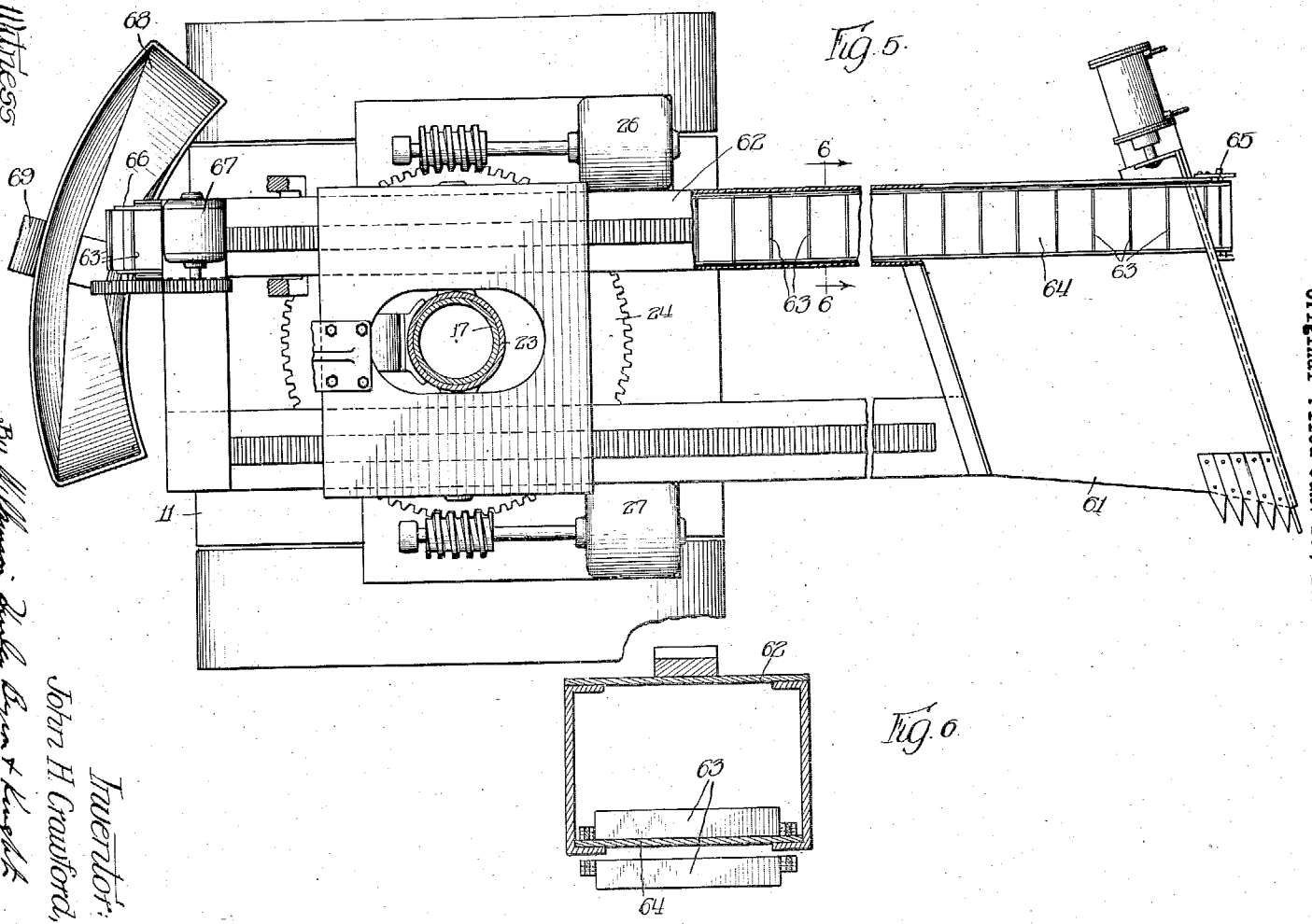
Inventor:
John H. Crawford,
By Wilkinson Huxley Byron & Knight
Attys.
Witness
R. Burkhardt.

Reissued Oct. 22, 1929

Re. 17,467

UNITED STATES PATENT OFFICE

JOHN H. CRAWFORD, OF HARRISBURG, ILLINOIS

MINING APPARATUS

Original No. 1,617,941, dated February 15, 1927, Serial No. 1,539, filed January 10, 1925. Application for reissue filed February 15, 1929. Serial No. 340,293.

This invention relates to a new and improved mining apparatus and more particularly, to a machine adapted to both dig and load material such as coal in the relatively restricted areas available in underground mining operations.

This invention relates specificially to a device which is capable of removing coal or other material, directly from the face or breast of the coal in a coal mine, for example, by purely mechanical means, without the intervention or either undercutting or of shooting the seam, and then depositing the recovered coal directly into pit cars or similar conveyances.

One known type of device heretofore employed in mines, operates a suitably arranged scraper which is controlled by a system of wire rope haulage, by which means the shot down coal is gathered by a scraper and dragged a varying distance to an inclined plane, at the upper side of which, the scraper dumps its accumulation of coal into the pit car.

A considerable number of other coal loading devices combine the conveyor, scraper and actuating mechanism in one compact whole which is brought directly up the shot and undercut face and the coal gathered and conveyed into the pit cars, which are disposed directly back of the loading device.

Other types consist merely of conveyers which are forced under the shot down coal, dependence being placed upon the conveyor flights to gather the coal.

Some machines perform all the functions of coal winning in one operation or, sequence of operations, in that they do their own undercutting by means of power driven punchers or chains. After the undercutting is accomplished, the conveyor portion of the mechanism is run into the kerf produced and then either the punchers or the other cutting chains knock down the coal above the kerf and convey it into the pit cars behind the machine. With these machines, no explosive is required but they are complicated and of low capacity and have not come into very general use. Still other types of these machines depend upon shovel devices for gathering the shot down coal similar to the small steam shovels in use today on excavation work above ground level.

It is an object of the present invention to provide a new and improved mining machine adapted to both remove the material directly from its position in the seam and to load it on to cars or other conveying means.

It is a further object to provide an apparatus of this character adapted for use in mine chambers having a low roof.

It is an additional object to provide a type of mining machine adapted to make a lateral cut in the material being mined.

Other and further objects will appear as the description proceeds.

I have illustrated somewhat diagrammatically certain preferred embodiments of my invention in the accompanying drawings in which:

Figure 3 is a plan view of the form of construction shown in Figure 1;

Figure 4 is a fragmentary section taken on line 4—4 of Figure 3;

Figure 5 is a view similar to Figure 3 but showing a modified form of construction and Figure 6 is a section taken on line 6—6 of Figure 5 and shown on an enlarged scale.

Figures 1, 2:
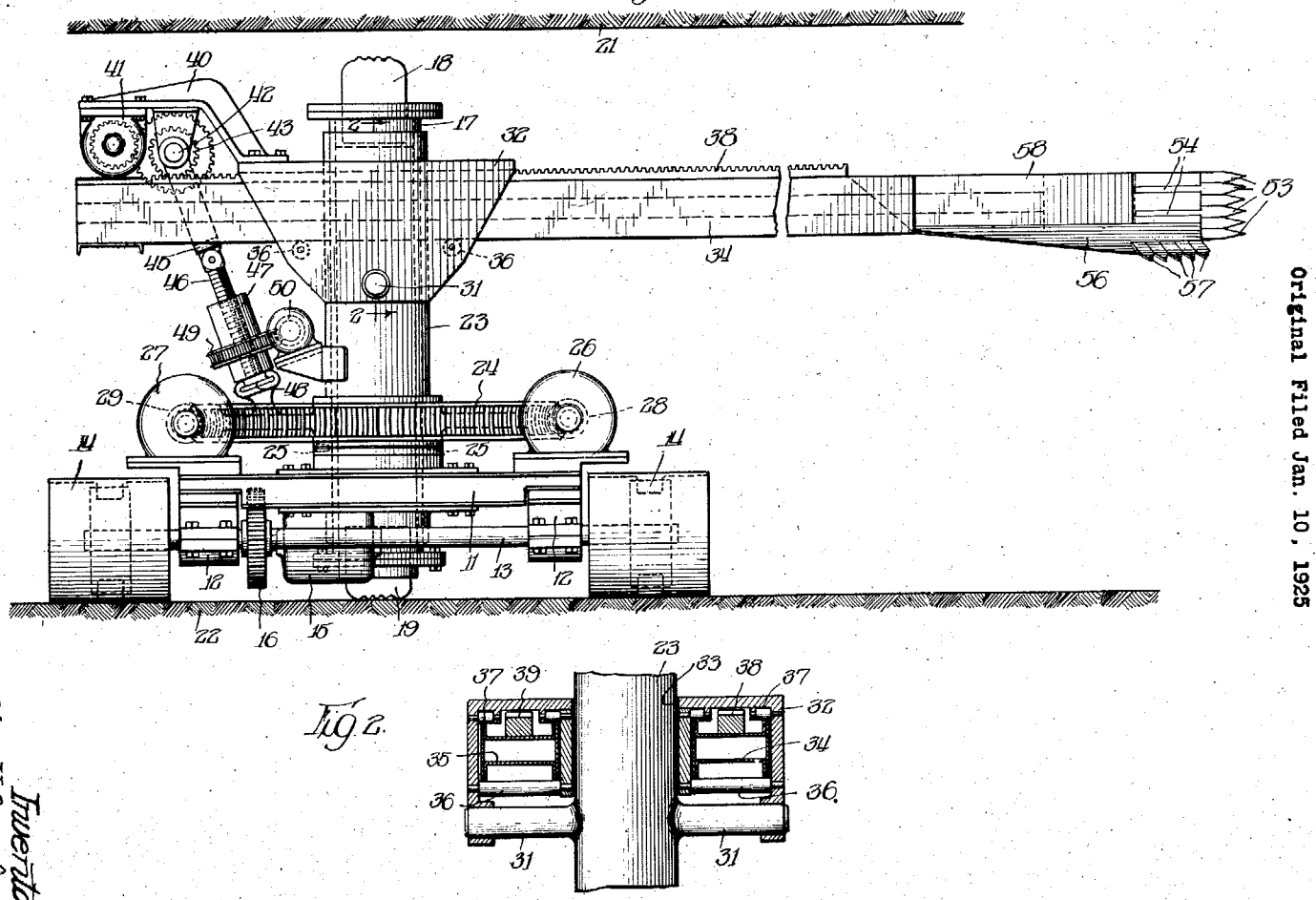
Figure 1 is a side elevation of the machine.
Figure 2 is a fragmentary cross section taken on line 2—2 of Figure 1.

The apparatus comprises the main platform 11 which is supported by bearings 12 on the axles 13 which latter serve to drive the caterpillar traction elements 14. The platform 11 carries the electric motor 15 which, through suitable gearing, drives the gear 16 mounted on the shaft 13.

The platform 11 also carries the fixed pillar 17. At the top of this pillar is the hydraulic jack 18, and at the bottom a similar jack 19 into either or both of which fluid may be pumped by the hydraulic pump unit 20 carried by the platform 11. These units 18 and 19 may be caused to firmly engage the roof 21 and the floor 22 to anchor the apparatus in place.

The fixed column 17 also carries the rotating sleeve 23, the lower end of which is fixedly secured to the rotating drive member 24. The sleeve 23 and member 24 are carried on the circular roller bearing 25, as indicated in Figure 1. The platform 11 carries the motors 26 and 27, which drive the worms 28 and 29 respectively, engaging the worm gear 30 upon the outer periphery of the drive member 24.

As best shown in Figure 2, the sleeve 23 is provided with the laterally extending trunnions 31. These carry the cradle 32, which is provided upon its upper face with the openings 33 adapted to permit the cradle to tilt on its trunnions without engaging the sleeve 23. The booms 34 and 35 pass through the cradle 32 and are supported on the rollers 36 carried by the cradle. Their upper edges are also guided by the rollers 37. The upper sides of the booms carry the racks 38 and 39.

The cradle 32 supports the bracket 40, which carries the motor 41 and the transverse shaft 42. This shaft 42 is driven by motor 41 by means of suitable gears and carries the gears 43 and 44 meshing with the racks 38 and 39. The shaft 42 has fitted thereon the upper end of the yoke 45, the lower end of which is pivotedly connected to the screw 46. The lower end of the screw 46 is carried in the member 47 which is in turn supported at 48 on the drive member 24. The number 47 carries the worm gear 49 which is driven by a worm connection from motor 50.

The dipper, or spoon 51 is carried upon the forward end of the booms 34 and 35. The front member 52 of the spoon carries the teeth 53 upon its forward edge. Certain of these teeth 53 are connected by bars 54 with the air knocker 55 carried upon the rear face of the spoon 51. These bars 54, may be located in grooves cast or planed in the front face member 52 as shown in Figure 4. The forward portion of the bottom 56 of the dipper is provided with the fixed teeth 57.

The pusher plate 58 is normally fitted against the rear wall 59 of the spoon 51. This plate 58 is connected by shaft 59 to a reciprocating piston carried in the cylinder 60 on the rear of the spoon.

The form of construction shown in Figures 5 and 6 differs from that above described, merely in the means for discharging the mined material from the spoon 61. The boom 62 which is associated with the rear edge of the spoon 61 is made in box shape, as shown in Figure 6. The upper run of the drag conveyor 63 passes over the inside of the bottom plate of the boom 62. This plate is extended forward at 64 to form the rear portion of the bottom of the spoon 61. The forward end of this conveyor passes over the roller 65 and the rear end passes over the roller 66. This roller 66 is driven by the motor 67 carried by the rear end of the boom. The arcuate discharge hopper 68 is carried from the body of the machine or from the platform 11 and serves to receive material passing from the conveyor through a considerable arc of movement. The material passes from the hopper 68 through the chute 69.

In the operation of the form of machine shown in Figures 1 to 4 the machine moves into the room, or entry of the mine under its own power, the motor 15 driving the caterpillar tractor members. The machine is stopped adjacent the breast of coal to be mined and by means of hydraulic power supplied by unit 20, the jacks 18 and 19 are brought firmly to bear against the roof and floors respectively, thus anchoring the machine. The booms 34 and 35 are run out by means of motor 41 until the teeth are in contact with the left side of the face to be cut. The booms will be tilted upwardly by power supplied from the motor 50. This rotates the member 47 drawing down the screw 46 and by means of the yoke 45 pulling down upon the bracket 40 connected to the rear end of the cradle 32. The cradle 32 is thus tilted about the trunnions 31.

The spoon is now swung clockwise against the coal by applying power through motors 26 and 27 to the drive member 24. This member 24 rotates the cradle through trunnions 31 and the engagement of the cradle with the booms positively swings them together with the spoon. During this movement, fluid power, as for example compressed air, may be supplied to the knocker cylinder 55 which, by means of bars 54, serves to rapidly reciprocate certain of the teeth 53. This facilitates the cutting action of the spoon.

When the spoon is loaded, the swinging action is stopped, the spoon is retracted from the face by bringing the booms back through the cradle by power supplied by motor 41. The booms are then rotated to bring the forward edge of the spoon over the car or other means for receiving the coal and the coal is pushed from the spoon by admitting fluid under pressure to the rear end of the cylinder 60. This causes the member 58 to clear the spoon. The member 58 is retracted and the spoon swung back into position and the cut continued.

The operation of the form of construction shown in Figures 5 and 6 is similar to that just described with the exception of the discharge of the material from the spoon. In this form, the coal or other material mined may be continuously discharged from the spoon by means of the drag conveyor 63. The hopper 68 may be constructed to cover any desired arc of movement and will discharge material at a fixed point relative to the machine through chute 69. If the hopper be of a less arc than the digging arc of the apparatus, the conveyor may be operated intermittently when the boom has been swung sufficiently to bring its discharge end above the hopper.

While I have shown certain preferred embodiments of my invention, it is to be understood that these are illustrative only and I contemplate such changes and modifications as come within the spirit and scope of the accompanying claims.

I claim:

1. In a mining machine, a movable platform, a shovel supported from said platform, teeth upon an edge of the shovel, certain of said teeth being fixed and others being movable, and means adapted to reciprocate the movable teeth.

2. In a mining machine, a movable platform, a shovel supported from said platform, teeth upon an edge of the shovel, certain of said teeth being fixed and others being movable, means extending from the movable teeth to the rear of the shovel, said means being located within the contour of the shovel, and pistons and cylinders coacting with said means to reciprocate said teeth.

3. In a mining machine, a movable platform, a fixed column carried by said platform, trunnions rotatably carried by said column, a cradle carried on said trunnions, a shovel and shovel carrying booms extending through said cradle.

4. In a mining machine, a movable platform, a fixed column carried by said platform, trunnions rotatably carried by said column, a cradle carried on said trunnions, a shovel and shovel carrying booms extending through said cradle, and means carried by the cradle for moving said booms longitudinally relative to the cradle.

5. In a mining machine, the combination of a movable platform, a combined digging and raking device, a boom therefor, means mounting said boom for movement from side to side for digging material from the mine face, and for vertical adjusting movement, and for a forward and backward raking movement, and means for moving and controlling the movement of said boom, said digging and raking device having teeth placed at a penetrating angle to the face of the mine wall and being adapted to advance and move laterally on a digging stroke inwardly of the mine wall face.

6. A mining machine having a movable platform, a boom carried by said platform, a digging and raking tool on the end of said boom, said boom being mounted for horizontal and vertical swinging movements, and in and out longitudinal movements, and means for moving said boom in all of said directions, said boom being provided with a conveyor track and a conveyor operatively mounted on said track, said conveyor extending adjacent said tool in a position to receive material dug thereby.

7. A mining machine having a movable platform, a boom carried by said platform, a digging and raking tool on the end of said boom, said boom being mounted for horizontal and vertical swinging movements, and in and out longitudinal movements, and means for moving said boom in all of said directions, said boom being provided with a conveyor track and a conveyor operatively mounted on said track, said conveyor extending adjacent said tool, in a position to receive material dug thereby and a second conveyor fixedly mounted relative to said platform, having means associated therewith for directing material onto said second conveyor, said last named means being constructed to receive material from said first conveyor from any of a plurality of positions of said boom.

8. A mining machine adapted to dig and remove material from a substantially vertical face of a mine wall, comprising a single digging and raking device having a material receiving portion and teeth on the edge of said portion, said teeth being disposed to penetrate the face of the mine wall when said digging and raking device is swung bodily in a horizontal path, a boom for said digging and raking device rigidly attached thereto, and means for mounting said boom for pivotal movement on vertical and horizontal axes and for longitudinal movement toward and away from the face of the mine wall.

Signed at Harrisburg, Illinois, this 12th day of February, 1929.

JOHN H. CRAWFORD.